(12) United States Patent
Davis

(10) Patent No.: US 6,783,327 B1
(45) Date of Patent: Aug. 31, 2004

(54) HELICOPTER BLADE FOLDING WITH BLADE DROOP

(75) Inventor: Bruce T. Davis, Fort Salonga, NY (US)

(73) Assignee: Davis Aircraft Products Co., Inc., Bohemia, NY (US)

( * ) Notice: Subject to any disclaimer, the term of this patent is extended or adjusted under 35 U.S.C. 154(b) by 0 days.

(21) Appl. No.: 10/317,877

(22) Filed: Dec. 12, 2002

(51) Int. Cl.⁷ ............................................. B64C 11/28
(52) U.S. Cl. ........................... 416/1; 416/141; 416/143
(58) Field of Search ................................ 416/131, 141, 416/142, 143, 210 R, 244 R, 1

(56) References Cited

U.S. PATENT DOCUMENTS

| | | | |
|---|---|---|---|
| 3,743,441 A | 7/1973 | Ferris | 416/143 |
| 4,268,222 A | 5/1981 | Bernard | 416/1 |
| 4,284,387 A | 8/1981 | Ferris | 416/134 |
| 4,354,234 A | 10/1982 | MacLennan et al. | 364/424 |
| 4,436,483 A * | 3/1984 | Watson | 416/143 |
| 4,712,978 A * | 12/1987 | Tiemann | 416/1 |
| 4,738,592 A | 4/1988 | Cavanaugh | 416/140 |
| 6,036,442 A * | 3/2000 | Certain et al. | 416/143 |
| 6,213,712 B1 | 4/2001 | Muylaert | 416/1 |

* cited by examiner

Primary Examiner—Ninh H. Nguyen
(74) Attorney, Agent, or Firm—Kenneth P. Robinson

(57) ABSTRACT

Blade fold hinge units are attachable between each helicopter blade and its hub attachment point, while maintaining continuity of mechanical connection of each blade to its hub portion. A two portion hinge unit has a first portion for blade attachment and a second portion for hub attachment. The first and second portions are hinged via a transverse pin to enable blade drooping downward, before or after a blade is pivoted to an aft position for helicopter storage or shipment. Upon aft pivoting of a blade, undesired further pivoting or knuckling of the hinge unit relative to the hub is prevented by addition of a lock link. After blade folding, the blades may be suitably fixed in position adjacent the aft portion of the helicopter body.

15 Claims, 6 Drawing Sheets

HELICOPTER BLADE FOLDING WITH BLADE DROOP

RELATED APPLICATIONS (Not Applicable)

FEDERALLY SPONSORED RESEARCH (Not Applicable)

BACKGROUND OF THE INVENTION

The invention relates to helicopter storage and shipment and, more particularly, to folding of helicopter blades to reduce space required for storage or other purposes.

The large radial dimensions of a helicopter rotor assembly cause a parked helicopter to occupy a space which is large relative to actual body dimensions. For helicopter storage, transport or shipboard use, for example, the space requirements for a helicopter may be reduced by up to two thirds by removal of the main rotor blades.

Removal of the main blades of a helicopter is disadvantageous because of time and equipment requirements, the need for separate blade storage and, perhaps most importantly, requirements for blade balancing, test and recertification which may apply if individual blades are physically separated from their operating positions on the rotor hub assembly.

Alternatively, space requirements may be reduced by folding helicopter blades back to positions overlying or contiguous to the helicopter tail assembly. Many approaches to blade folding have previously been proposed. Approaches relying upon mechanisms added to the rotor hub assembly to enable automated blade folding typically add significant additional complexity, weight and cost to the rotor hub assembly, and may raise reliability issues. Approaches based on temporarily attaching a mechanical assembly between a hub and blade at the time a blade is to folded typically involve complex mechanisms which may be difficult to install, may not permit two-dimensional placement of blade tips, may require modifications to the rotor mechanism, and may have other inherent functional or reliability limitations. For example, some such approaches are subject to the limitation that at least one bolt or pin between each blade and its blade mounting position must remain in its original position during folding, thereby limiting freedom of action during folding.

Helicopter blades, during operation, are rotated principally in a horizontal plane. If a blade is folded by swinging it back with movement only in two dimensions (e.g., in a horizontal plane) the blade tip will be positioned at a significant vertical distance above the tail section. If, during folding, blade movement in a third dimension is also enabled (i.e., blade tip movement vertically), the end of the blade may be brought down closer to the tail section of the helicopter permitting the lowered blade tip to be secured to or near the tail section. This movement of a helicopter blade tip downward from its normal operating alignment during blade folding will be termed "blade droop" for present purposes. Prior mechanisms or techniques have not permitted blade droop or have otherwise been subject to limitations or cost or complexity disadvantages.

Objects of the present invention are, therefore, to provide new and improved blade folding units and methods having one or more of the following characteristics and capabilities:

readily installable at time of folding;

low complexity, reliable construction;

installation using existing apertures in blades and blade support components;

blade folding while retaining blade attachment to its hub position;

three-dimensional blade folding with blade droop;

low cost construction; and ease of technician field use without dependence on special tools or external power sources.

SUMMARY OF THE INVENTION

In accordance with the invention, a blade fold hinge unit, usable with a helicopter blade attached to a blade support via two blade pins to enable blade folding with removal of both blade pins while retaining blade connection continuity, includes two portions. The first portion is configured for pivotal attachment to the blade via a first pin positionable in alignable apertures in the first portion and the blade upon removal of one of the blade pins. The second portion is configured for pivotal attachment to the blade support via a second pin positionable in alignable apertures in the second portion and the blade support upon such removal of the blade pin. The hinge unit includes a hinge pin positioned in aligned apertures in the first and second portions to pivotally hinge the first portion to the second portion, the center line of the hinge pin extending transversely to the insertion axes of the first and second pins. The blade fold hinge unit is configured to enable attachment between the blade and blade support upon such removal of one of the two blade pins and to maintain connection continuity of the blade to the blade support via the hinge unit upon removal of the other blade pin for blade folding.

The blade fold hinge unit may also include a pivot limit pin positioned in slots of predetermined length to limit pivotally hinged displacement of the first portion relative to the second portion, to permit drooping of the free end of the blade downward. A lock link may be configured for contact with the second portion to restrain its pivotal displacement relative to the blade support and may also restrict relative motion of the first and second portions subsequent to movement of the blade to a folded position. A restraining strut may be employed to restrain pivotal motion of a folded blade relative to the blade support.

Also in accordance with the invention, a method for folding and drooping a helicopter blade attached to a blade support via two blade pins, with removal of both such blade pins while retaining blade connection continuity, includes the following steps:

(a) removing one blade pin from first apertures in the blade and first apertures in the blade support, so that the blade can then be rotated forward;

(b) attaching a first portion of a hinge unit to the blade via a pin positioned in the first apertures in the blade;

(c) attaching a second portion of the hinge unit to the blade support via a pin positioned in the first apertures in the blade support;

(d) removing the other blade pin from second apertures in the blade and second apertures in the blade support;

(e) pivoting the blade to a folded position; and (f) pivoting the first portion relative to the second portion to droop the free end of the blade downward.

Further steps may be included to address installing of the lock link and restraining strut referred to above.

For a better understanding of the invention, together with other and further objects, reference is made to the accom-

DESCRIPTION OF THE INVENTION

Figure 1:
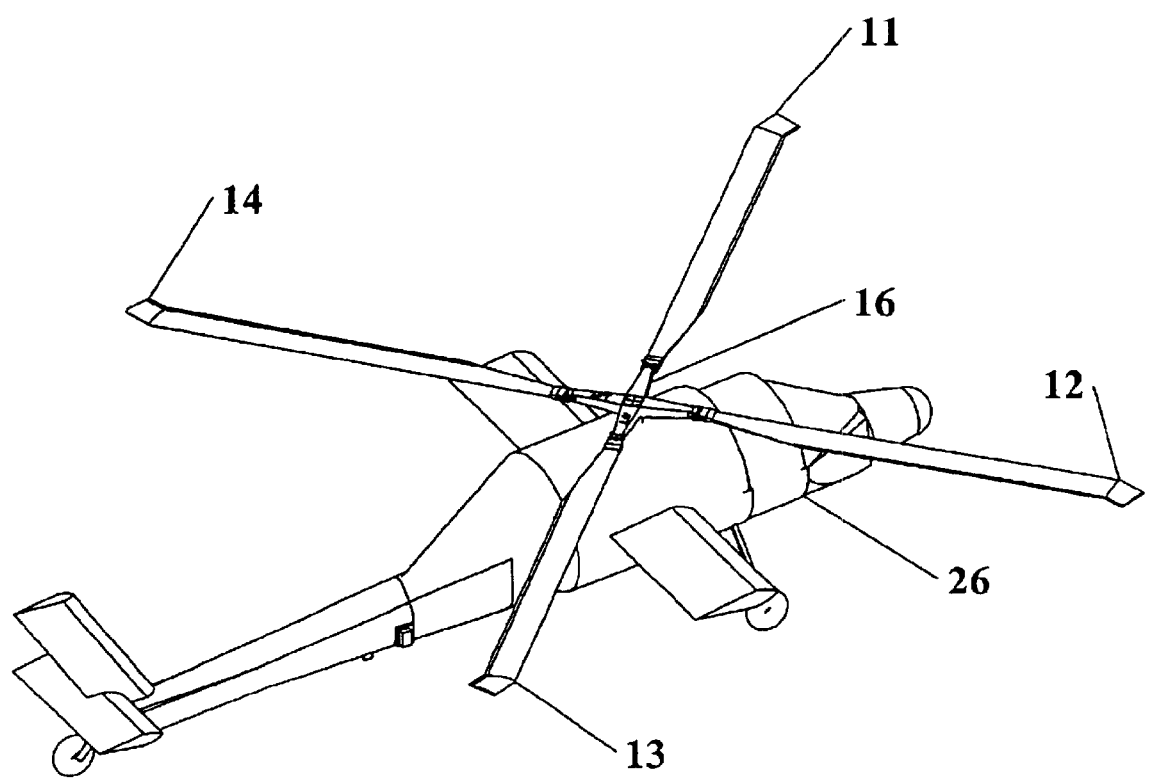
FIG. 1 shows a helicopter with four helicopter blades mounted to a hub in operating position.

FIG. 1 shows a set of four helicopter blades 11, 12, 13, 14 mounted on a hub or blade support assembly 16 in operational alignment. As illustrated, the blade support assembly is shown mounted to a vertical shaft assembly 18, representing a mechanical assembly of a helicopter represented at 26. As discussed, storage of a helicopter must make provision for the full spread of the blades extending in four directions in this configuration, even though the body portion of the helicopter may be relatively narrow.

Figure 2:
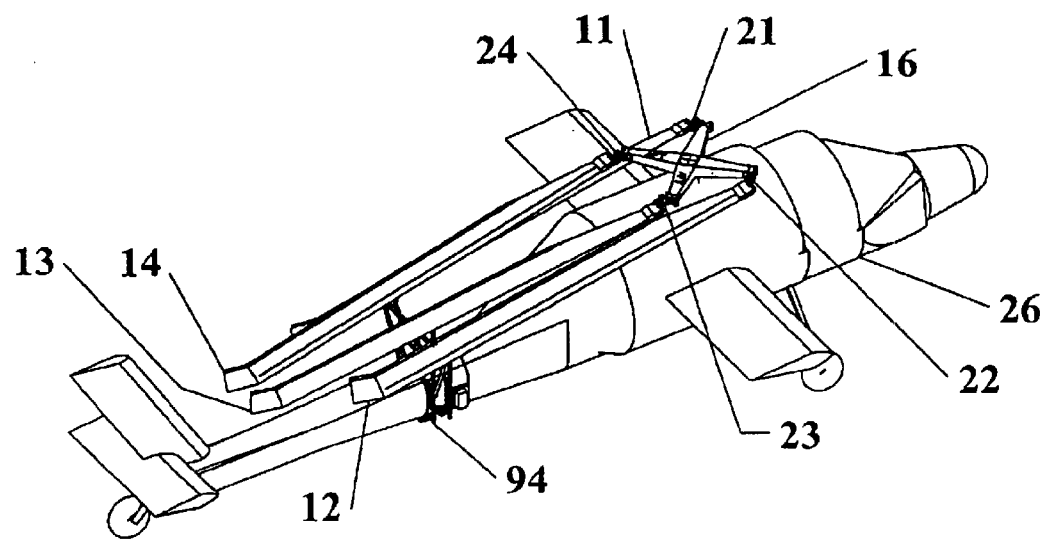
FIG. 2 shows the helicopter of FIG. 1 with the blades folded back pursuant to the invention.

FIG. 2 shows the blades 11, 12, 13, 14 in folded position, with blade droop, pursuant to the invention. As will be discussed further, in FIG. 2 blade fold hinge units 21, 22, 23, 24 are installed between individual blades 11, 12, 13, 14 and the blade support assembly 16 to enable blade folding with blade droop as illustrated.

Figure 3:
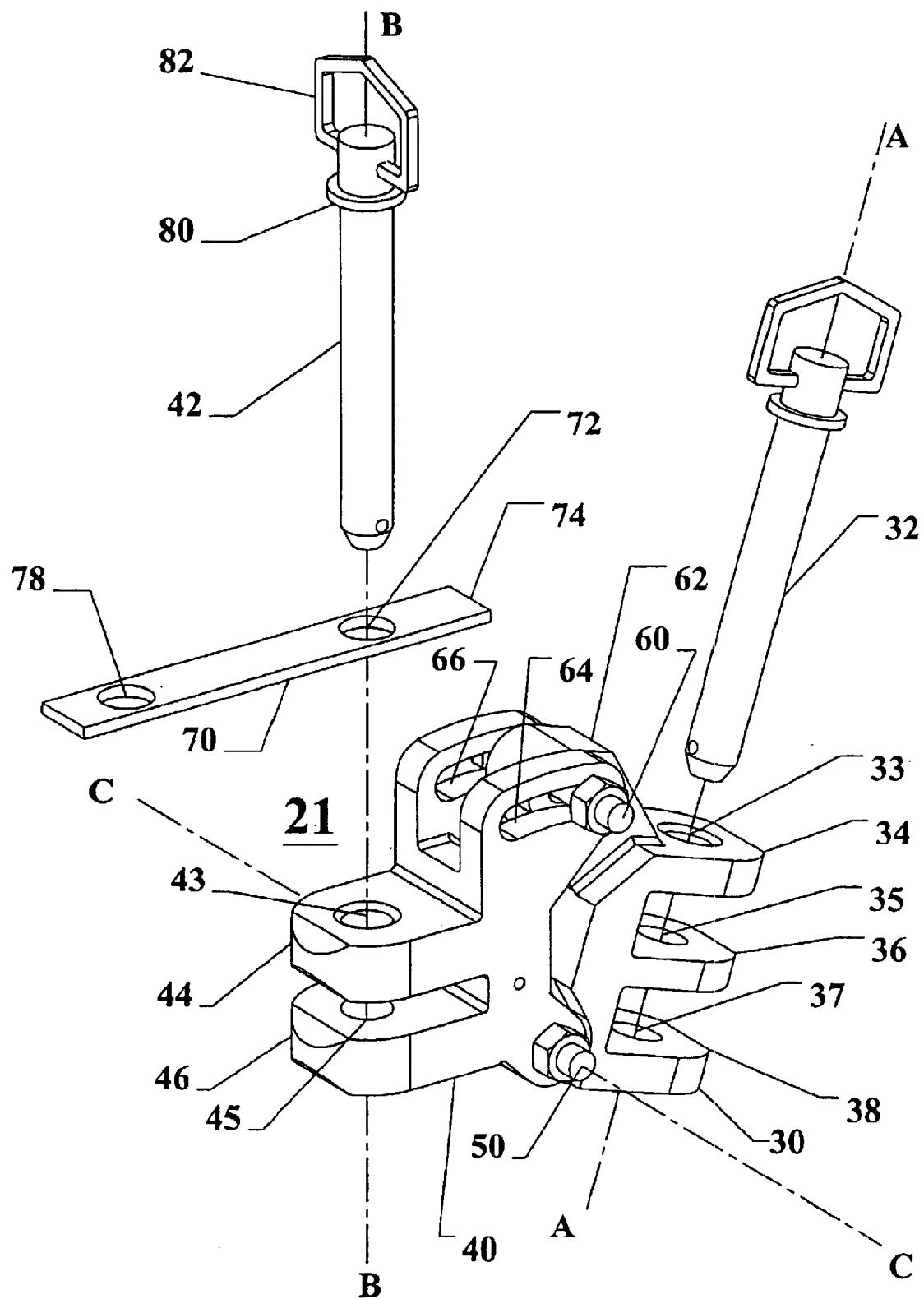
FIG. 3 shows an embodiment of a blade fold hinge unit pursuant to the invention.

Referring now to FIG. 3, an embodiment of a blade fold hinge unit 21 is shown in greater detail. As will be described, hinge unit 21 is usable with a helicopter blade configured for two-pin attachment to a blade support, to enable blade folding with removal of both blade pins while retaining blade connection continuity. As shown, hinge unit 21 includes a first portion 30 configured for pivotal attachment to a blade (e.g., blade 11 of FIG. 2) via a first pin 32 positionable in alignable apertures in first portion 30 and apertures in blade 11. The apertures 33, 35, 37 in first portion 30 are provided in a structural configuration including respective protruding portions 34, 36, 38, which comprise a half-hinge type construction dimensioned to mesh with a complementary half-hinge type construction existing at the hub end of the blade 11 (see FIG. 5). Thus, apertures 33, 35, 37 are alignable with apertures in the complementary half-hinge structure on blade 11 to permit first pin 32 to be inserted through the aligned apertures to provide attachment in meshed relationship in a manner similar to the manner in which a hinge pin is inserted into the two portions of an ordinary residential door hinge to hold the two portions together, while permitting rotational movement of one element relative to the other about an axis coinciding with the longitudinal axis of the first pin 32, when inserted. The corresponding axis associated with hinge unit 21 is identified as axis A—A in FIG. 3, which may be referred to as the insertion axis of first pin 32.

Hinge unit 21 also includes a second portion 40 configured for pivotal attachment to a blade support (e.g., to blade support 16 of FIG. 2) via a second pin 42 positionable in alignable apertures 43, 45 in second portion 40 and apertures in the blade support 16. The apertures 43, 45 are provided in a structural configuration including respective protruding portions 44, 46, which comprise a half-hinge type construction dimensioned to mesh with a complementary half-hinge type construction existing at the blade attachment extremities of blade support 16 (see FIG. 5). Thus, apertures 43, 45 are alignable with apertures in the complementary half-hinge structure on blade support 16 to permit second pin 42 to be inserted through the aligned apertures to provide attachment in meshed relationship, while permitting rotational movement of one element relative to the other about an axis coinciding with the longitudinal axis of the second pin, when inserted. The corresponding axis associated with hinge unit 21 is identified as axis B—B in FIG. 3 which is the insertion axis of second pin 42.

Hinge unit 21 of FIG. 3 includes a hinge pin 50 positioned in aligned apertures in the first and second portions 30 and 40 to pivotally hinge them. In FIG. 3, hinge pin 50 is shown inserted into an aperture in a lower section of second portion 40, so that only the head of pin 50 is visible. Hinge pin 50 is inserted through aligned apertures in complementary cooperating sections of the portions 40 and 30 which are of suitable form and dimensioning to permit hinge-type movement of one portion relative to the other about an axis coinciding with the longitudinal axis of hinge pin 50, identified as axis C—C in FIG. 3. Preferably, the construction is such as to retain hinge pin 50 in position, unless and until action is taken to intentionally remove it. Hinge pin 50 may thus be considered to be a captive pin held in place to prevent it from accidentally falling out during use or handling of hinge unit 21.

In the FIG. 3 configuration, hinge unit 21 further includes a pivot limit pin 60. As shown, pin 60 is arranged to be retained in an aperture in an extension 62 of first portion 30 which extends between two laterally spaced slotted sections of second portion 40. With this configuration, the apertures 64, 66 in such spaced slotted sections of second portion 40 are slots of predetermined length in which respective ends of pivot limit pin 60 extending out of extension 62 may be moved. As discussed, first and second portions 30 and 40 are pivotally hinged to permit motion of one portion relative to the other about the axis C—C through pin 50. With pin 60 thus a captive pin in the aperture in extension 62, the slots formed by apertures 64 and 66 are dimensioned to limit pivotally hinged displacement of the first portion 30 relative to second portion 40, to permit drooping of the free end of a blade downward, as will be further discussed. Apertures 64 and 66 each comprise a slot of a length predetermined to permit travel of the respective ends of pivot limit pin 60 in those slots to permit a desired range of drooping of the free end of a blade downward during blade folding. The ends of pin 60 are thus protrusions extending from extension 62 into apertures 64, 66 and in other embodiments protrusions for this purpose may be suitably formed with or without inclusion of a discrete pin, such as pin 60, to appropriately limit the hinged motion as described.

Also shown in FIG. 3 is a lock link 70, having an aperture 72 which can be positioned over the top of pin 42, with end 74 extending into the space between apertures 64 and 66 below extension 62. As will be discussed, lock link 70 is of length suitable for contact with the second portion 40 to restrain its pivotal displacement relative to blade support 16 subsequent to movement of the blade 11 to a folded position. The lock link 70 is used with a lock link pin 76, shown in FIG. 9, which is insertable into blade support 16 (in the former position of the other blade pin) and over the top of which aperture 78 of lock link 70 can be positioned. In addition, end 74 of lock link 70 may contact extension 62 so as to limit pivotal motion of second portion 40 relative to first portion 30. Installation of lock link 70 will be described further with reference to FIG. 9.

As illustrated for second pin 42 of FIG. 3, each of the first pin 32, second pin 42 and lock link pin 76 may include a shoulder 80, which acts as a stop when a pin is inserted into its respective apertures, and also a grip loop 82. In this embodiment, a grip loop 82 is inserted into a transverse aperture near the top of a pin and is usable to aid pin removal. In addition, each grip loop may be formed of suitably springy material to permit its removal and replacement. In particular, for second pin 42 and lock link pin 76 the respective grip loops may be removed to permit placement of lock link 70 over the tops of those pins and replaced to provide stops to constrain lock link 70 from moving up, off of the pins. Removal of the grip loops 82 permits removal of lock link 70 when that is desired.

While a presently preferred embodiment of a blade fold hinge unit is illustrated in FIG. 3, many variations in form and construction may be employed by skilled persons as suitable in particular applications of the invention. Such variations will typically include the basic aspects of a first portion, a second portion and a hinge pin to pivotally hinge those portions. A pivot limit pin configuration may also be included, as appropriate in particular applications.

Figure 4:
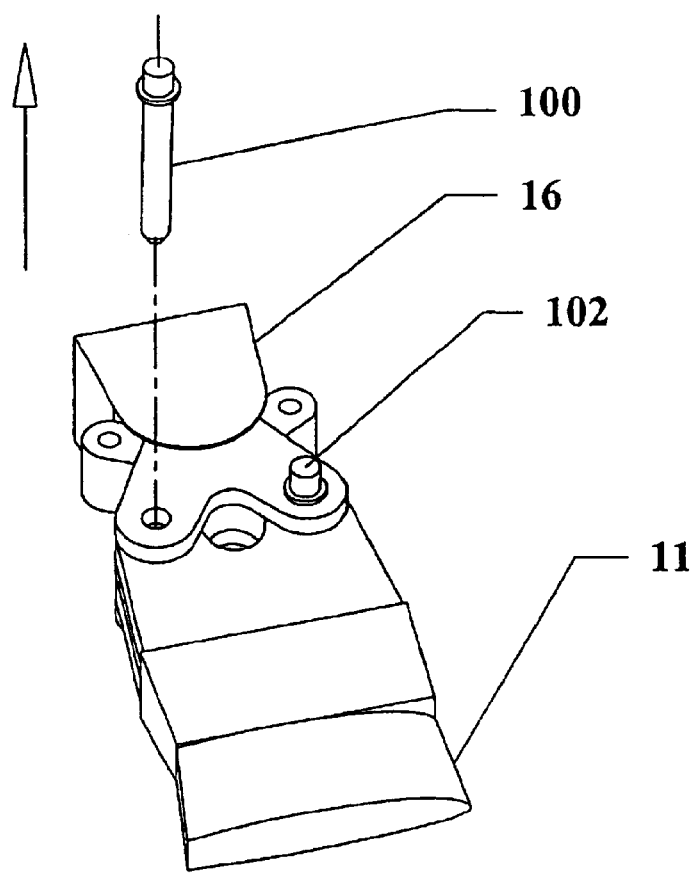
FIGS. 4, 5, 6, 7, 8 and 9 illustrate successive aspects of installation and use of a blade fold hinge unit pursuant to the invention.
Figure 5:
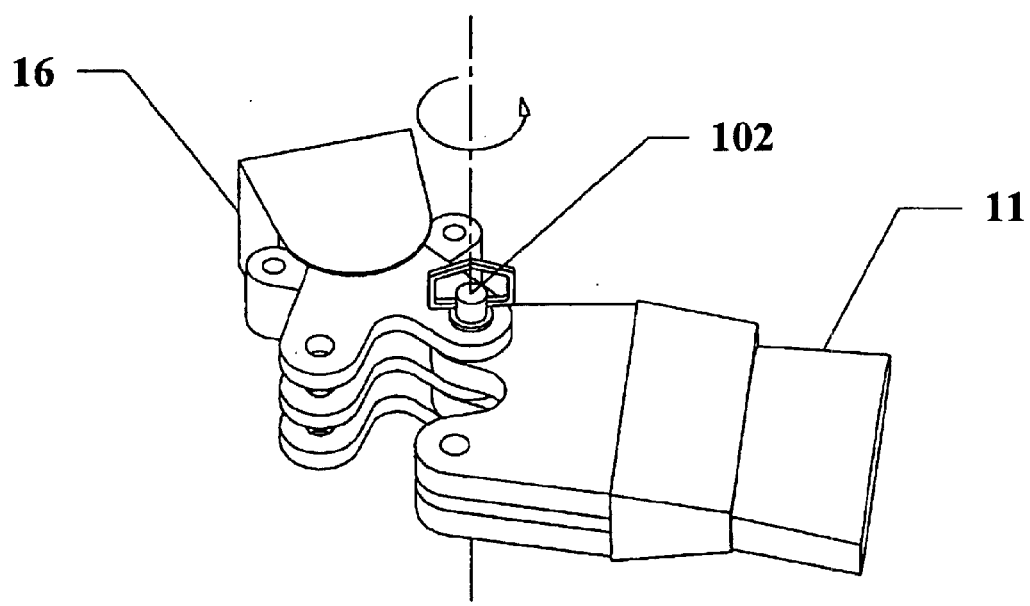

FIGS. 4–9 will be referred to in discussion of a method for folding and drooping a helicopter blade attached to a blade support assembly of a helicopter. In these figures the front of the helicopter is to the right, with aft to the left, for the right side blades 12 and 13 as shown in FIG. 1. In FIG. 4 one of two blade pins used for operational attachment of blade 11 to blade support 16 is shown as having been removed (i.e., the aft blade pin 100 in this example). For illustration purposes, the free end and most of the length of blade 11 extending from its attachment end have been removed in this view. In FIG. 5 blade 11 has been rotated forward around the axis of the forward blade pin 102, which remains in its operational position in this view. For present purposes, "operational" is used to refer to the blade support configuration for normal flight operations.

Figure 6:
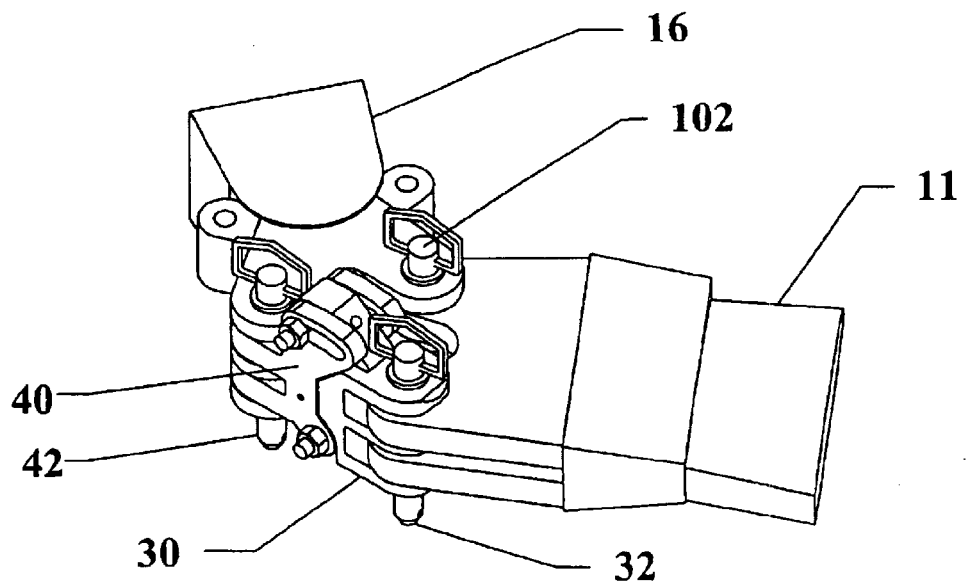

In FIG. 6 the first portion 30 of hinge unit 21 has been attached to blade 11 via first pin 32 positioned in first apertures of the blade 11. As discussed above, for this purpose first pin 32 is inserted through apertures 33, 35, 37 in protruding portions 34, 36, 38 of first section 30 which are configured to mesh in hinge fashion with cooperating hinge-type protrusions at the end of blade 11, so that first pin 32 passes through the aligned apertures in first portion 30 and blade 11. In similar manner, second portion 40 of hinge unit 21 is attached to the blade support 16 via second pin 42 positioned in apertures 43 and 45 which are aligned with apertures in cooperating hinge-type protrusions of blade support 16.

Figure 7:
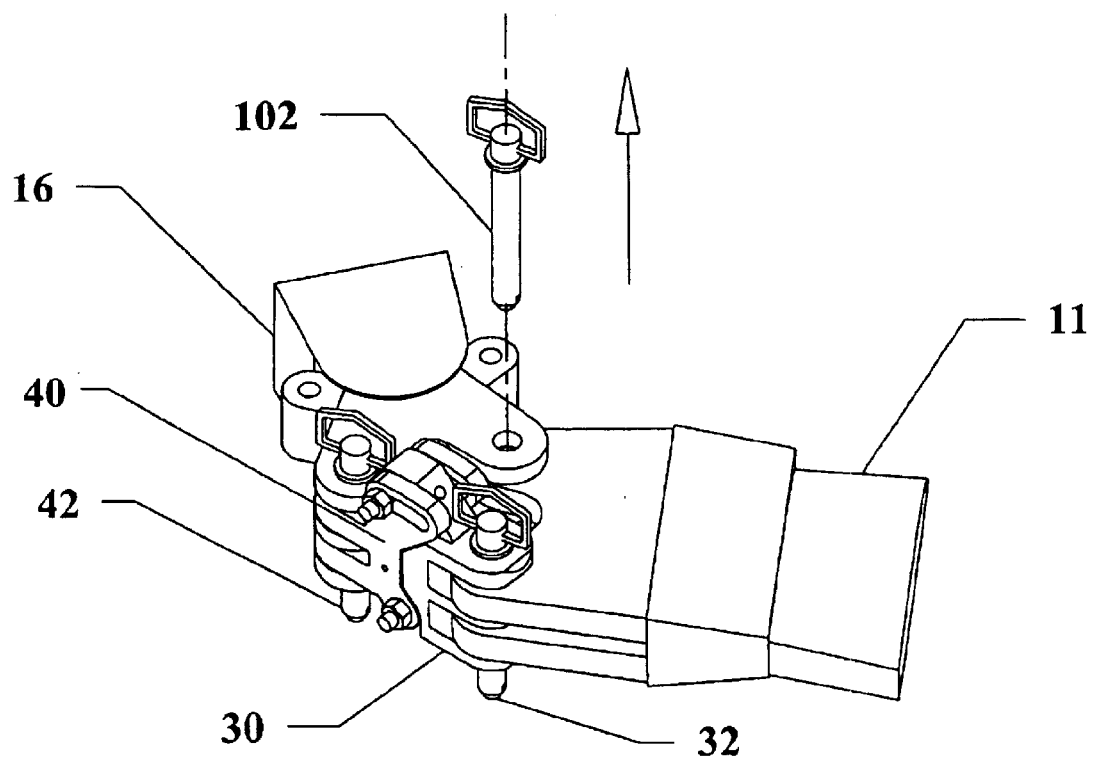
Figure 8:
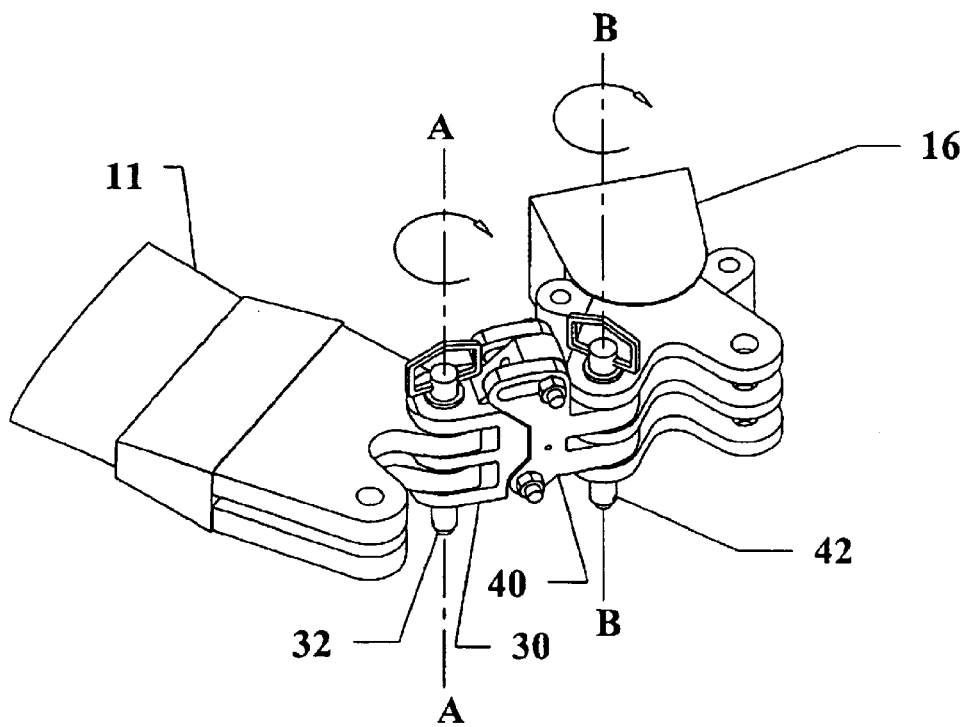

In FIG. 7 the second blade pin 102 used for operational attachment of blade 11 has been removed. In FIG. 8 blade 11, which had been rotated to a forward position, is pivoted or folded aft to a folded position. This is enabled by rotation of hinge unit 21 about axis B—B and blade 11 about axis A—A. As shown in FIG. 8, axis A—A through first pin 32 and axis B—B through second pin 42 remain in parallel relationship and no blade droop has been implemented.

Figure 9:
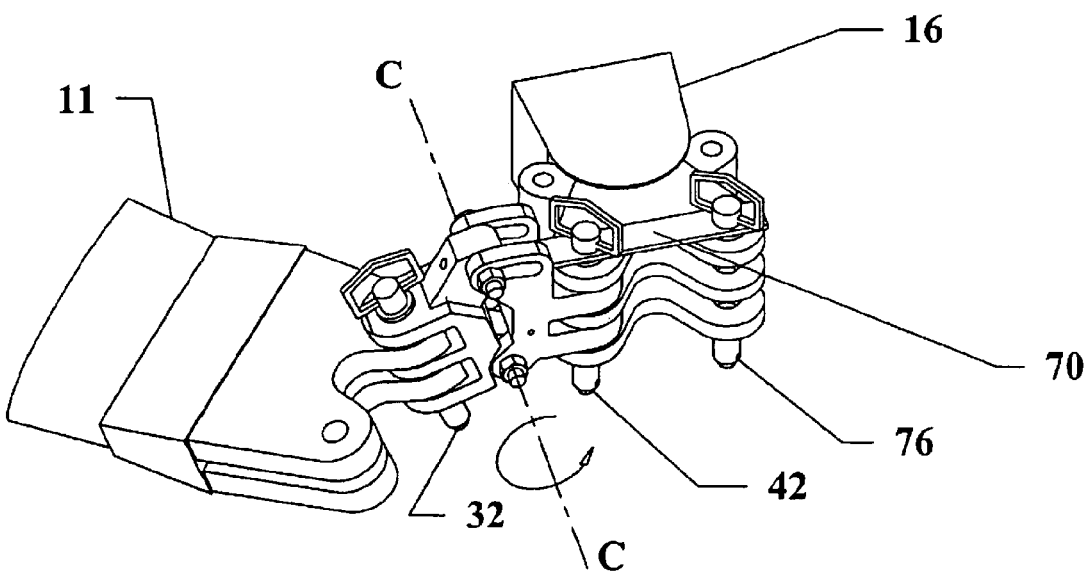

In FIG. 9 drooping of the free end of blade 11 downward has been implemented, so that in addition to the blade having been folded to the rear of the helicopter body (not shown), the free end of blade 11 will be drooped to a lower position for ease of temporarily restraining the blade end to prevent blade movement during storage. Referring back to FIG. 7, it will be appreciated that once the second blade pin is removed, as indicated, the blade 11 can be drooped by downward rotation of first portion 30 of hinge unit about axis C—C through the hinge pin 50. It may be easier for personnel to handle the pivoting of blade 11 to its aft storage position if the free end of blade 11 is drooped downward, closer to the ground, prior to aft pivoting. Thus, the steps of aft pivoting and blade drooping can be implemented in either order, or simultaneously, as appropriate in particular circumstances.

FIG. 9 also illustrates the position of lock link 70 after installation subsequent to aft pivoting of blade 11. As shown, lock link pin 76 has been inserted into blade support 16 in the apertures formerly occupied by the second blade pin 102 (whose removal is indicated in FIG. 7). Lock link 70 is then put in place with the tops of second pin 42 and lock link pin 76 protruding up through apertures 74 and 78 respectively. Grip loops 82, as discussed with reference to FIG. 3, can then be inserted into transverse apertures in pins 42 and 76 to provide stops to constrain lock link 70 from moving upward, off of the pins. In this position, end 74 of lock link 70 extends into the space between the laterally spaced upper portions of the second portion 40 of the hinge unit 21, as discussed with reference to FIG. 3. With this configuration, lock link 70 is effective to restrain pivotal displacement of second portion 40 of the hinge unit relative to blade support 16 after aft pivoting of blade 11 to its storage position. Thus, second portion 40 (and thereby the hinge unit 21 including first portion 30) is effectively locked in a 90 degree side orientation relative to the direction in which blade 11 would extend when in operating position. This may be considered to prevent what may be termed knuckling of the assembly, whereby minor movement of blade 11 while stored could occur if the hinge unit 21 were permitted to rotate about second pin 42 (i.e., about axis B of FIG. 8) while remaining attached to blade 11. With lock link 70 in position as shown, an anti-knuckling constraint is provided. Lock link 70 may additionally be configured to restrict upward rotation of second portion 40 relative to first portion 30 about axis C—C.

Figure 10:
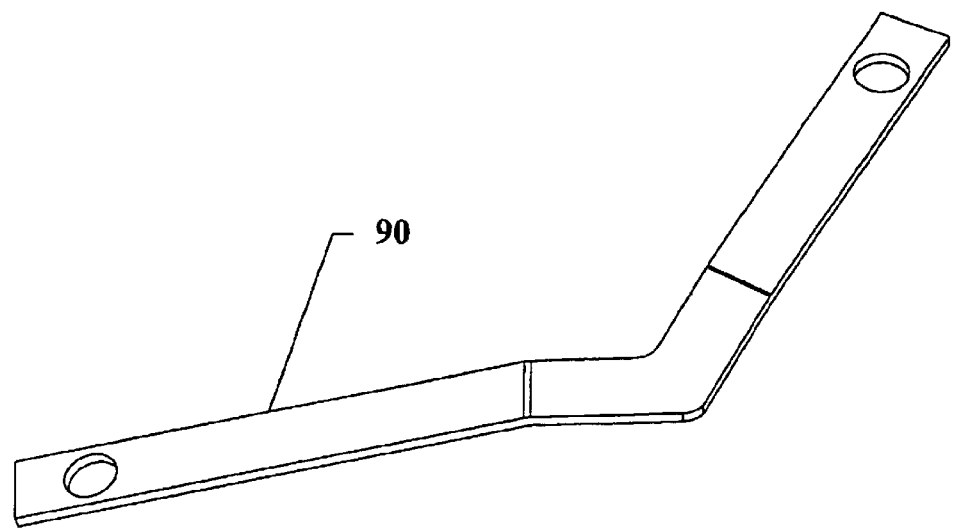
FIG. 10 shows a form of restraining strut usable to restrict movement of a folded blade.
Figure 11:
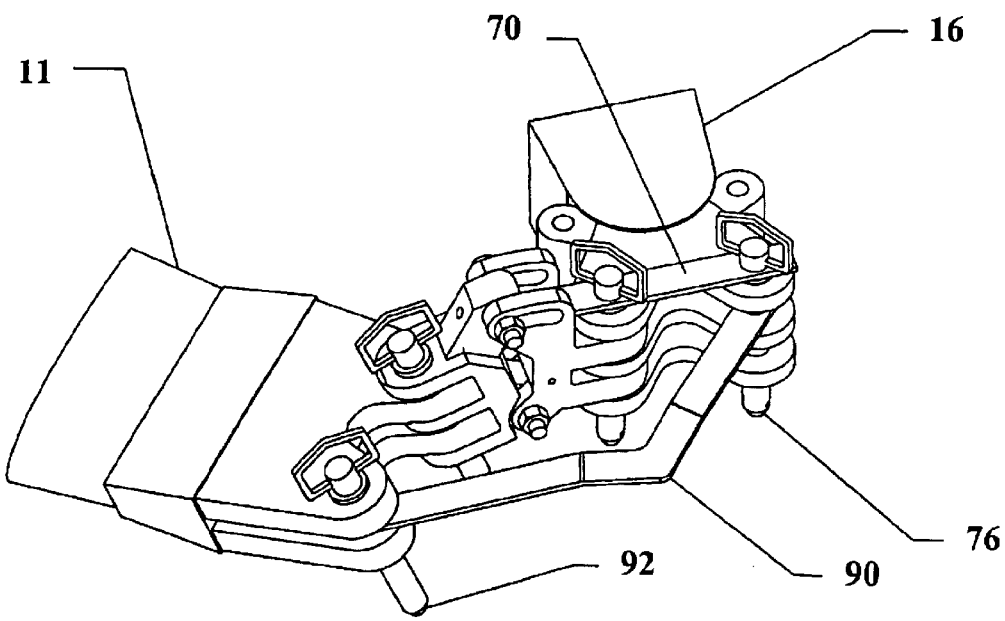
FIG. 11 shows the FIG. 10 restraining strut in place in the installed blade fold hinge unit.

FIG. 10 shows a form of restraining strut 90 which may be employed to pivotal motion of the blade 11 after it has been folded. FIG. 11 shows restraining strut 90 in place with one end positioned between the hinge-type protrusions at the end of blade 11 from which the second blade pin 102 was removed as indicated in FIG. 7. In FIG. 11, this end of the restraining strut 90 is held in place by pin 92 (or alternatively by replacement of blade pin 102). The other end of restraining strut 90 (the right end in FIG. 11) is positioned between the hinge-type protrusions of blade support 16 from which the second blade pin 102 was removed. As shown, this end of the restraining strut is held in place by pin 76. Restraining strut 90 may include a longitudinal offset in its center portion, so as to permit its ends to be accurately aligned with slots between the respective hinge-type protrusions into which its ends are inserted. As shown in FIG. 12, restraining strut 90 is thus of length suitable for connection between apertures in blade 11 and blade support 16 after the other or second blade pin 102 has been removed from these apertures (see FIG. 7) and subsequent to movement of blade 11 to a folded position. Restraining strut 90 may be installed at the time when pin 76 is inserted to retain lock link 70. In FIG. 2, at the tail section of the helicopter there is shown a structural assembly 94 provided to support and hold in position the ends of the folded blades. Such an assembly 94 of suitable form and design may be provided by skilled persons and, depending upon the capabilities thereof, may obviate the need for inclusion of a restraining strut 90 for each blade. Thus, restraining strut 90 and assembly 94 may be included or omitted, as appropriate in particular implementations.

The invention thus permits efficient blade folding and drooping by use of a reliable, easy to use blade fold hinge unit. One hinge unit is employed for each of the helicopter blades (four in this example). The blades may be folded simultaneously or sequentially in any order, consistent with the availability of personnel, time, etc. One appropriate order of folding (looking down on the four blade configuration of FIG. 1) is to fold right side blades 13 and 12 in that order pursuant to the method discussed above, with removal of the left blade pin 100 (the aft pin in this case) first as in FIG. 4 to permit installation of second portion 40 at that blade pin position. The above method can then be used to fold left side blades 14 and 11 in that order, however, with removal of the right blade pin (the aft pin in this case) first to permit installation of second portion 40 of a hinge unit at that blade pin position. Thus, in each instance the blade fold hinge unit must be attached at the respective aft blade pin position to enable aft pivoting of each blade to its folded position. Suitable fastening devices or arrangements (such as structural assembly 94 referred to above) can then be employed to appropriately restrain the free blade ends near the aft fuselage of the helicopter to avoid undesired movement or pivoting of the blades during storage or transportation.

Thus it will be seen that efficient and reliable blade folding is provided, while avoiding requirements for high cost automated folding hardware and while retaining blade position integrity by maintaining continuity of mechanical attachment of each blade to its appropriate blade support or hub connection point.

While there have been described the currently preferred embodiments of the invention, those skilled in the art will recognize that other and further modifications may be made without departing from the invention and it is intended to claim all modifications and variations as fall within the scope of the invention.

What is claimed is:

1. A blade fold hinge unit, usable with a helicopter blade attached to a blade support via two blade pins, to enable blade folding with removal of both said blade pins while retaining blade connection continuity, comprising:
    a first portion configured for pivotal attachment to the blade via a first pin positionable in alignable apertures in said first portion and the blade upon removal of one said blade pin;
    a second portion configured for pivotal attachment to the blade support via a second pin positionable in alignable apertures in said second portion and the blade support upon removal of said one blade pin;
    a hinge pin positioned in aligned apertures in said first and second portions to pivotally hinge the first portion to the second portion, the center line of the hinge pin extending transversely to the insertion axes of said first and second pins; and
    a restraining strut of length suitable for connection between apertures in said blade and said blade support after said other blade pin has been removed therefrom and subsequent to movement of the blade to a folded position;
    the blade fold hinge unit configured to enable attachment between the blade and blade support upon removal of said one blade pin and to maintain connection continuity of the blade to the blade support via said hinge unit upon removal of the other said blade pin for blade folding.

2. A blade fold unit as in claim 1, additionally comprising:
    a first pin positionable in the alignable apertures in said first portion and the blade; and
    a second pin positionable in the alignable apertures in said second portion and the blade support.

3. A blade fold hinge unit as in claim 1, additionally comprising:
    a pivot limit pin positioned in apertures in said first and second portions and having a centerline parallel to the centerline of the hinge pin;
    said apertures in at least one of said first and second portions comprising slots of predetermined length to limit pivotally hinged displacement of said first portion relative to said second portion, to permit drooping of the free end of the blade downward.

4. A blade fold hinge unit as in claim 1, additionally comprising:
    a pivot limit protrusion fixed to one of said first and second portions and extending into at least one aperture in the other one of said first and second portions;
    said at least one aperture comprising a slot of predetermined length to constrain movement of the pivot limit protrusion to limit pivotally hinged displacement of said first portion relative to said second portion.

5. A blade fold hinge unit as in claim 1, additionally comprising:
    a lock link of length suitable for contact with said second portion to restrain its pivotal displacement relative to the blade support subsequent to movement of the blade to a folded position; and
    a lock link pin, insertable into the blade support in the former position of the other said blade pin after removal thereof, to maintain the lock link in position.

6. A blade fold unit as in claim 5, wherein said lock link includes a first aperture to encompass an end of said lock link pin and a second aperture to encompass an end of said second pin, when said second pin is positioned in said alignable apertures in said second portion and the blade support.

7. A blade fold hinge unit, usable with a helicopter blade attached to a blade support via two blade pins to enable blade folding with blade droop, comprising:
    a first portion configured for pivotal attachment to the blade via a first pin positionable in alignable apertures in said first portion and the blade upon removal of one said blade pin;
    a second portion configured for pivotal attachment to the blade support via a second pin positionable in alignable apertures in said second portion and the blade support upon removal of said one blade pin;
    a hinge pin positioned in aligned apertures in said first and second portions to pivotally hinge the first portion to the second portion, to permit the free end of the blade to move downward to a drooped position;
    a lock link of length suitable for contact with said second portion to restrain its pivotal displacement relative to the blade support subsequent to movement of the blade to a folded positions; and
    a lock link pin, insertable into the blade support in the former position of the other said blade pin after removal thereof, to maintain the lock link in position.

8. A blade fold unit as in claim 7, additionally comprising:

a first pin positionable in the alignable apertures in said first portion and the blade; and a second pin positionable in the alignable apertures in said second portion and the blade support.

9. A blade fold hinge unit as in claim 7, additionally comprising:

a pivot limit pin positioned in apertures in said first and second portions and having a centerline parallel to the centerline of the hinge pin;

said apertures in at least one of said first and second portions comprising slots of predetermined length to limit pivotally hinged displacement of said first portion relative to said second portion.

10. A blade fold hinge unit as in claim 7, additionally comprising:

a pivot limit protrusion fixed to one of said first and second portions and extending into at least one aperture in the other one of said first and second portions;

said at least one aperture comprising a slot of predetermined length to constrain movement of the pivot limit protrusion to limit pivotally hinged displacement of said first portion relative to said second portion.

11. A blade fold unit as in claim 7, wherein said lock link includes a first aperture to encompass an end of said lock link pin and a second aperture to encompass an end of said second pin, when said second pin is positioned in said alignable apertures in said second portion and the blade support.

12. A method for folding and drooping a helicopter blade attached to a blade support via two blade pins, with removal of both said pins while retaining blade connection continuity, comprising the steps of:

(a) removing one said blade pin from first apertures in the blade and first apertures in the blade support, so the blade can be rotated forward;

(b) attaching a first portion of a hinge unit to the blade via a pin positioned in said first apertures in the blade;

(c) attaching a second portion of the hinge unit to the blade support via a pin positioned in said first apertures in the blade support;

(d) removing the other said blade pin from second apertures in the blade and second apertures in the blade support;

(e) pivoting the blade to a folded position;

(f) pivoting said first portion relative to said second portion to droop the free end of the blade downward; and (g) attaching a lock link, via a pin positioned in said second apertures in the blade support, to limit pivoting of said second portion relative to the blade support while the blade is in said folded position.

13. A method as in claim 12, wherein step (f) is implemented one of: before, with and after step (e).

14. A method as in claim 12, additionally comprising the step of:

(h) attaching a restraining strut via said pin positioned in said second apertures in the blade support and a pin positioned in said second apertures in the blade, to restrain pivoting of the blade after it is in said folded position.

15. A method as in claim 14, additionally comprising the step of:

(i) securing the free end of the blade to limit displacement while the blade is in the folded position.

* * * * *